US011985586B2

(12) United States Patent
Siddalinga et al.

(10) Patent No.: US 11,985,586 B2
(45) Date of Patent: May 14, 2024

(54) ENHANCED CELLULAR SCANNING

(71) Applicant: COMCAST CABLE COMMUNICATIONS, LLC, Philadelphia, PA (US)

(72) Inventors: Prasad Ramanahally Siddalinga, Wayne, PA (US); Sanjay Kumar Sharma, Downingtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 235 days.

(21) Appl. No.: 16/809,402

(22) Filed: Mar. 4, 2020

(65) Prior Publication Data
US 2020/0288387 A1 Sep. 10, 2020

Related U.S. Application Data

(60) Provisional application No. 62/813,625, filed on Mar. 4, 2019.

(51) Int. Cl.
H04W 76/12 (2018.01)
H04W 4/029 (2018.01)
H04W 48/16 (2009.01)
H04W 84/12 (2009.01)

(52) U.S. Cl.
CPC ........... *H04W 48/16* (2013.01); *H04W 4/029* (2018.02); *H04W 76/12* (2018.02); *H04W 84/12* (2013.01)

(58) Field of Classification Search
CPC .. H04W 76/12; H04W 4/029; H04W 52/0254
See application file for complete search history.

(56) References Cited

U.S. PATENT DOCUMENTS

| 7,792,554 | B2* | 9/2010 | Abdel-Kader | .... H04W 52/0261 455/574 |
| 9,084,081 | B2 | 7/2015 | Gupta et al. | |
| 9,571,868 | B2* | 2/2017 | Shaw | ...................... H04W 4/50 |
| 10,039,042 | B2 | 7/2018 | Fu et al. | |
| 2006/0172737 | A1* | 8/2006 | Hind | ...................... H04W 48/18 455/435.2 |

(Continued)

OTHER PUBLICATIONS

CATT: "WLAN Scanning on WLAN/3GPP Radio interworking", 3GPP Draft; R2-130971, 3rd Generation Partnership Project (3GPP), Mobile Competence Centre ; 650, Route Des Lucioles ; F-06921 Sophia-Antipolis Cedex ; France 1-15 H04W vol. RAN WG2, No. Chicago, US; Apr. 15, 2013-Apr. 19, 2013 Apr. 4, 2013 (Apr. 4, 2013), XP050699127.

*Primary Examiner* — Myron Wyche
(74) *Attorney, Agent, or Firm* — BakerHostetler

(57) ABSTRACT

A device such as a mobile device may be configured to connect to and/or communicate with one or more networks. The device may receive information indicating that there is at least one other network within a range of the device. One of the networks within range of the device may comprise a preferred cellular network. The device may then scan for the preferred cellular network and communicate with the preferred cellular network. The device may also detect the preferred cellular network based on information stored on the device. When the device is within range of the preferred cellular network, the device may detect the preferred cellular network based on the stored information and begin communicating with the preferred cellular network.

20 Claims, 7 Drawing Sheets

(56) References Cited

U.S. PATENT DOCUMENTS

| | | | |
|---|---|---|---|
| 2006/0217147 A1 | 9/2006 | Olvera-Hernandez et al. | |
| 2010/0075669 A1 | 3/2010 | Sparks et al. | |
| 2010/0173628 A1* | 7/2010 | Hosain | H04W 48/18 |
| | | | 455/435.2 |
| 2010/0317363 A1* | 12/2010 | Bai | H04W 72/21 |
| | | | 455/452.2 |
| 2013/0040697 A1* | 2/2013 | Ekici | H04W 88/06 |
| | | | 455/552.1 |
| 2018/0213458 A1* | 7/2018 | Belghoul | H04W 36/22 |
| 2018/0279071 A1* | 9/2018 | Sponza | H04W 4/02 |

* cited by examiner

ENHANCED CELLULAR SCANNING

CROSS REFERENCE TO RELATED APPLICATIONS

This application claims the benefit of U.S. Provisional Patent Application No. 62/813,625, filed Mar. 4, 2019, the contents of which are incorporated by reference in their entirety as if fully set forth herein.

BACKGROUND

Service providers may provide one or both of Wi-Fi services and cellular services for their customers. The service providers may have commercial arrangements with one or more cellular network partners and/or with one or more Wi-Fi network partners. The service providers may additionally or alternatively operate one or more cellular networks and/or one or more Wi-Fi networks of their own. Improved network discovery and scanning techniques for service providers may be desirable.

SUMMARY

Methods and systems are described for enhancing the discovery of one or more networks. The one or more networks may be discovered using Wi-Fi scanning. A device such as a mobile device may be configured to connect to and/or communicate with a Wi-Fi network. Based on the Wi-Fi communication, the Wi-Fi network may send information to the device indicating that there are one or more cellular networks nearby. This information may be sent during a Wi-Fi procedure such as a Wi-Fi negotiation procedure. The device may also detect the preferred network based on information stored on the device. When the device is within range of the preferred network, the device may detect the preferred network based on the stored information and begin communicating with the preferred network.

The information received from the Wi-Fi network or stored on the device may comprise one or more of the following: information about the cellular network operator, information about the cellular network geographic location or coverage bounds, or information about the frequency bands available for each geographic location. The information about the cellular networks can be filtered to specific devices based on various factors. The factors may include but are not limited to a current load on the Wi-Fi network or device subscription information. The device may scan for and connect to the cellular network based on at least a portion of the information.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Figure 1:
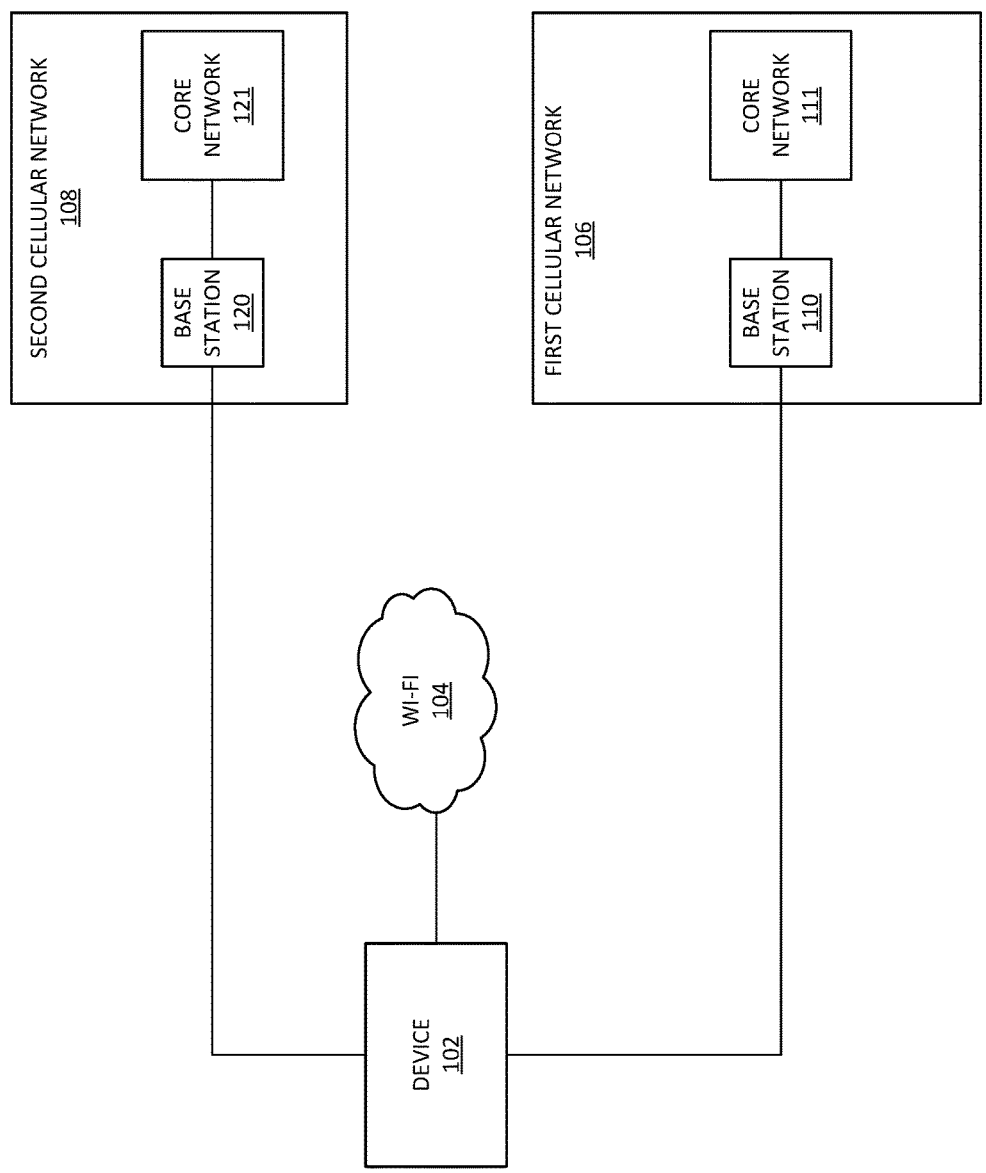
FIG. 1 shows an example system.

A service provider may provide one or both of Wi-Fi services and cellular services for their customers based on a commercial arrangement with one or more partner network operators or based on their own networks. The service provider may have a customer device connect to the most economical network available in order to lower operating costs. When connecting to a network, the device may scan for frequency bands from one or more cellular networks and/or from one or more Wi-Fi networks. The device may then connect to a preferred network. The network may be preferred based on one or more user experience parameters. Scanning for multiple networks may cause the device to consume excessive amounts of energy (e.g., battery power) or to use energy inefficiently. This problem may be particularly pronounced if the cellular network is a small cellular network that is not as densely deployed when compared to a cellular network of another network operator (e.g., a larger cellular network operator). As a result, network discovery and scanning techniques may need to be optimized for reduced network cost and device battery consumption.

Described herein are methods and systems for enhancing the discovery of one or more networks. The one or more networks may be discovered using Wi-Fi scanning. Wi-Fi scanning may be more energy efficient than cellular network scanning. Further, since most users keep Wi-Fi enabled on their device, using Wi-Fi scanning may be a convenient technique for most users. In accordance with the techniques described herein, devices that are communicating via Wi-Fi may receive information associated with available cellular networks.

A device may periodically scan for Wi-Fi networks and connect to a Wi-Fi network as it becomes available. Additionally or alternatively, the device may already be connected to the Wi-Fi network. The device may be configured to communicate with the Wi-Fi network. Based on the Wi-Fi communication (e.g., a Wi-Fi negotiation procedure), the Wi-Fi network may inform the device that there are one or more cellular networks within a range of the device. The Wi-Fi network may send, to the device, information indicating that the one or more cellular networks are within the range. The Wi-Fi network may be affiliated with the one or more cellular networks. For example, the Wi-Fi network may be operated by the same service provider as the one or more cellular networks. The information sent to the device may indicate that the one or more of the cellular networks is a preferred cellular network.

In another example, a device a may initially be connected a cellular network. The cellular network may not be a preferred cellular network. The device may determine that the device is within a geographic location associated with another cellular network. The device may determine that the device is within a geographic location associated with the other cellular network based on scanning for available cellular networks. The device may determine that the other cellular network is a preferred network. The device may determine that the other cellular network is a preferred network based on stored information. The device may then connect to the preferred network. The device may also disconnect from the non-preferred cellular network.

FIG. 1 shows a block diagram of an example system 100. The system shows a device 102, a Wi-Fi network 104, a first cellular network 106, and a second cellular network 108.

The device 102 may comprise a computing device or a mobile device, such as a cellular telephone, or any other device capable of connecting and/or communicating with one or more networks. The Wi-Fi network 104 may comprise one or more of: a wireless local area network (WLAN), an Institute of Electrical and Electronics Engineers (IEEE) 802.11 based network. The first cellular network 106 may comprise a small cellular network, a 4G network, a 5G non-standalone (NSA) network, or a 5G standalone (SA) network. The second cellular network 108 may comprise a small cellular network, a 4G network, a 5G NSA network, or a 5G SA network.

The Wi-Fi network 104 may be affiliated with the first cellular network 106. The Wi-Fi network 104 and the first cellular network 106 may be operated by the same service provider. The Wi-Fi network 104 may send, to the device 102, information associated with the first cellular network 106. The device may initially not be connected to any cellular network or may already be connected to a different cellular network (e.g., the second cellular network 108). The second cellular network 108 may be a large scale cellular network (such as a cellular network of a Mobile Network Operator (MNO)) while the first cellular network 106 may be a smaller scale cellular network (such as a cellular network of a Multiple System Operator (MSO)). The Wi-Fi network 104 may send, to the device 102, information indicating that the device 102 is within a geographic location associated with the first cellular network 106. The information may indicate that the first cellular network 106 is a preferred cellular network. Thus, as the device 102 is in communication with the Wi-Fi network 104 (e.g., connected to the Wi-Fi network 104 or attempting to connect to the Wi-Fi network 104), the device 102 may receive, from the Wi-Fi network 104 information associated with the first cellular network 106. The device 102 may then connect to the first cellular network 106. The device 102 may also disconnect from the second cellular network 108 if already connected to that cellular network. Alternatively, the Wi-Fi network 104 may send, to the device 102, information indicating that the device 102 is within a geographic location associated with the second cellular network 108. The information may indicate that the second cellular network 108 is the preferred cellular network. Thus, as the device 102 is in communication with the Wi-Fi network 104 (e.g., connected to the Wi-Fi network 104 or attempting to connect to the Wi-Fi network 104), the device 102 may receive, from the Wi-Fi network 104, information associated with the second cellular network 108. The device 102 may then connect with the second cellular network 108 or maintain its connection with the second cellular network 108 if already connected to that cellular network.

Alternatively, the Wi-Fi network 104 may be affiliated with the second cellular network 108. The Wi-Fi network 104 and the second cellular network 108 may be operated by the same service provider. The Wi-Fi network 104 may send, to the device 102, information associated with the second cellular network 108. The device 102 may initially not be connected to any cellular network or may already be connected to the first cellular network 106. The second cellular network 108 may be a large scale cellular network (such as a cellular network operated by an MNO) while the first cellular network 106 may be a smaller scale cellular network (e.g., a cellular network operated by an MSO). The Wi-Fi network 104 may send, to the device 102, information indicating that the device 102 is within a geographic location associated with the second cellular network 108. The information may indicate that the second cellular network 108 is a preferred cellular network. Thus, as the device 102 is in communication with the Wi-Fi network 104 (e.g., connected to the Wi-Fi network 104 or attempting to connect to the Wi-Fi network 104), the device 102 may receive, from the Wi-Fi network 104, information associated with the second cellular network 108. The device 102 may then connect to the second cellular network 108. The device may also disconnect from the first cellular network 108 if already connected to that cellular network. Alternatively, the Wi-Fi network 104 may send, to the device 102, information indicating that the device 102 is within a geographic location associated with the first cellular network 106. The information may indicate that the first cellular network 106 is the preferred cellular network. Thus, as the device 102 is in communication with the Wi-Fi network 104 (e.g., connected to the Wi-Fi network 104 or attempting to connect to the Wi-Fi network 104), the device 102 may receive, from the Wi-Fi network 104, information associated with the first cellular network 106. The device 102 may then connect with the first cellular network 106 or maintain its connection with the first cellular network 106 if already connected to that cellular network.

Alternatively, the device 102 may initially be connected the second cellular network 108. The second cellular network 108 may be a large scale cellular network (such as a cellular network of an MNO) while the first cellular network 106 may be a smaller scale cellular network (such as a cellular network of an MSO). The device 102 may determine that the device 102 is within a geographic location associated with the first cellular network 106. The device 102 may determine that the device 102 is within a geographic location associated with the first cellular network 106 based on scanning for available cellular networks. The device 102 may determine that the first cellular network 106 is a preferred cellular network. The device 102 may determine that the first cellular network 106 is a preferred cellular network based on stored information. The device 102 may then connect to the first cellular network 106. The device 102 may also disconnect from the second cellular network 108 if already connected to that cellular network.

The information associated with the cellular networks can be provided to the device 102 in any number of ways. Information may be provided during any stage of the Wi-Fi connection state. The information may be sent to the device 102 during a Wi-Fi discovery procedure. The Wi-Fi discovery procedure may comprise Passpoint Wi-Fi network discovery. The information may be sent to the device 102 during a connection or disconnection procedure with a public or private Wi-Fi network. The information may be sent to the device 102 while the device 102 is connected to the Wi-Fi network 104. Wi-Fi media access control (MAC) layer control or management frames may be used to send the information to the device 102. Higher layer protocols used in the wireless local area network (WLAN) infrastructure such as Access Network Query Protocol (ANQP) or generic advertisement service (GAS) may be modified or extended to send the information to the device. The information can be provided using one or more reserved fields (e.g., using a Wi-Fi ANQP and/or in one or more management or control frames (e.g., Wi-Fi Management/Control frames).

The device 102 may also store the information associated with the cellular networks. When scanning for available networks, the device 102 may detect one or more cellular networks within a geographic location. The device 102 may then determine based on the stored information that a cellular network within the geographic location is a preferred cellular network.

The information can be provided not only for overlapping cellular networks but also for geographic networks that are close by, which may allow the device 102 to attach to nearby cellular networks as the device 102 roams about in the area. The cellular networks may not overlap with each other. Additionally or alternatively, the cellular networks do not need to overlap with the Wi-Fi network 104. This information can be used by the device 102 to adjust scanning periodicity as the device 102 moves about in the area. The Wi-Fi network 104 may be able to tell the device 102 that there are no cellular networks nearby so that the device can conserve energy that would be otherwise spent searching for the cellular networks. The information about cellular networks can be filtered to specific devices based on various factors, including but not limited to a current load on the Wi-Fi network 104 (e.g., don't broadcast about a cellular network unless the load is above a particular threshold), and device subscription information (e.g., broadcasting cellular information only to devices that have subscriptions for both cellular and Wi-Fi networks).

The information may comprise one or more of information about a cellular network operator (e.g., PLMN ID), information about a cellular network geographic location/coverage bounds, or information about the bands available for each geographic location. Information about cellular network operators can be filtered or prioritized based on the network cost (e.g., first operators as the most preferred network, partner operators and other roaming networks, second cellular networks, etc.).

Figure 2:
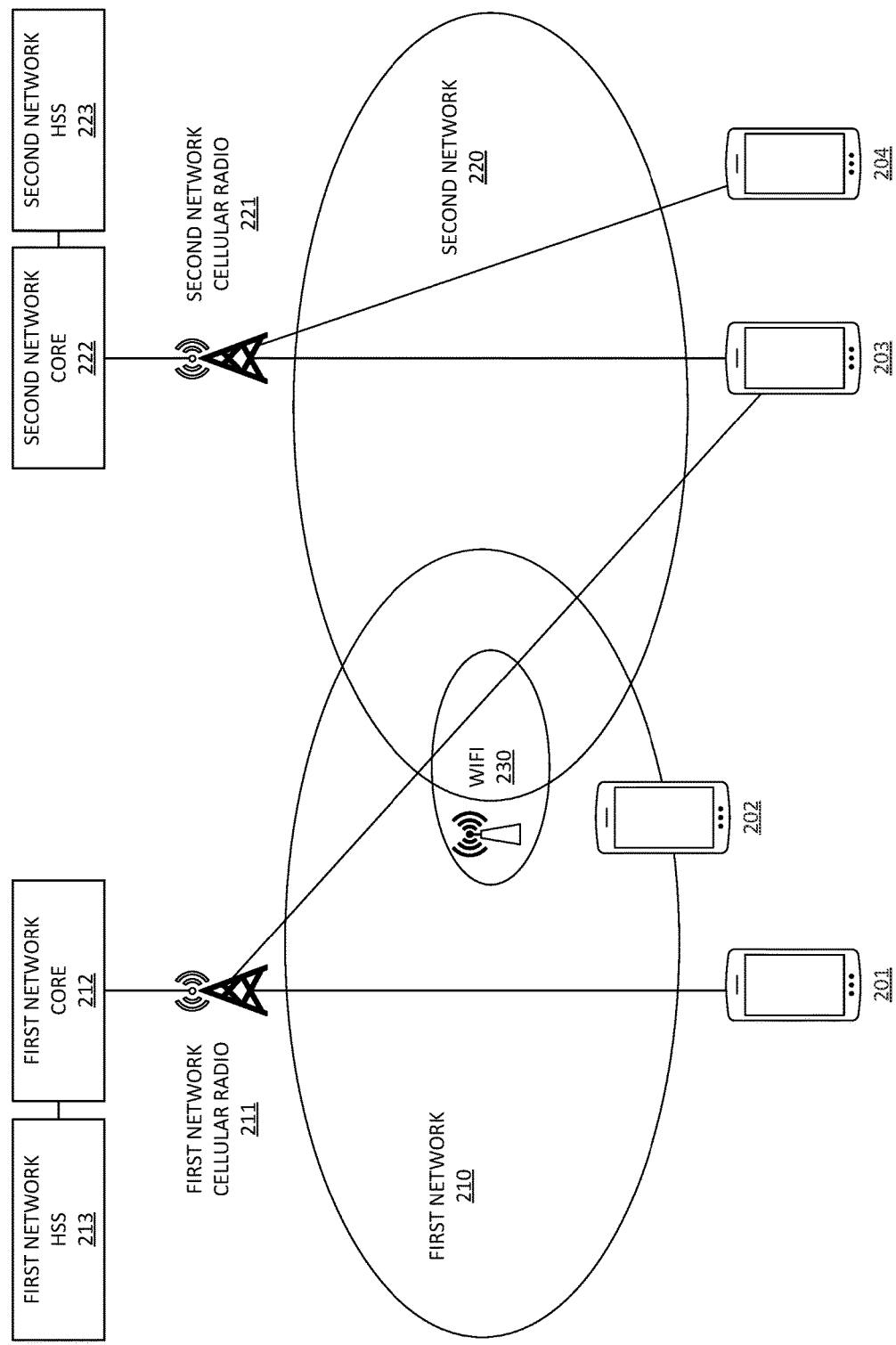
FIG. 2 shows an example system.

FIG. 2 shows an example system 200. The system 200 may comprise a first cellular network 210 and a second cellular network 220. The first cellular network 210 may be operated by a first service provider, such as an MNO. The first cellular network 210 may comprise a first cellular network radio 211 providing communication with a first network core 212 and a first network home subscriber server (HSS) 213. The first network HSS 213 may store user-related and subscriber-related information.

The second cellular network 220 may be operated by a second service provider, such as an MSO. The second cellular network 220 may comprise a second cellular network radio 221 providing communication with a second network core 222 and a second network HSS 223. The second network HSS 223 may store user-related and subscriber-related information.

A device 201 may comprise a computing device or a mobile device, such as a cellular telephone, or any other device capable of connecting and/or communicating with one or more networks. The device 201 may store more than one type of subscriber credentials used to connect to a network. The credentials may be associated with a subscriber identity module (SIM) card. The SIM card may comprise a universal integrated circuit card (UICC), an embedded UICC (eUICC), an integrated UICC (iUICC), or any other authentication or keying material stored in a secure location on the device (e.g., a SoftSIM or certificate). The device 201 may comprise more than one type of subscriber credentials, and therefore may be referred to as a multi credential device 201. The multi credential device 201 may comprise any combination of credentials derived from any of the types of credentials described above. For example, the device 201 may comprise more than one UICC, a UICC and an eUICC, a UICC and an iUICC, an eUICC and iUICC, or a UICC/eUICC/iUICC and any other certificate etc.

A first one or more of the credentials may enable the device 201 to connect to the first cellular network 210 and a second one or more of the credentials may enable the device 201 to connect to the second cellular network 220. The device 201 may be configured to employ the same telephone number when operating using any of its credentials (e.g., a first SIM card or a second SIM card). The device 201 may be configured to employ one telephone number when operating using a first credential (e.g., a first SIM card) and may be configured to employ a different telephone number when operating using a second credential (e.g., a second SIM card).

The device may comprise a single credential that enables the device to connect to the first cellular network 210 and the second cellular network 220 (e.g., at the same time or at two different times). The device may comprise a universal credential (e.g., a USIM) providing subscriptions for both the first cellular network 210 and the second cellular network 220.

A Wi-Fi network 230 may be associated with one or more cellular networks (e.g., the first cellular network 210 or the second cellular network 220). The Wi-Fi network 230 may be operated by the second service provider, which also operates the second cellular network 220. The device 201 may connect with the Wi-Fi network 230. The Wi-Fi network 230 may send to the device 201 an indication that there are one or more cellular networks nearby and that the device 201 should scan for those networks for a period of time as there is a high likelihood of the device 201 locating and connecting to one of the cellular networks (e.g., the first cellular network 210 or the second cellular network 220). For example, when the device 201 is in a location that is densely populated with cellular networks, there may be a high likelihood of the device 201 locating and connecting to one of the cellular networks (e.g., the first cellular network 210 or the second cellular network 220).

The Wi-Fi network 230 may determine that the device 201 is subscribed to both the Wi-Fi 230 and one or more cellular networks (e.g., the first cellular network 210 or the second cellular network 220) but that there are no cellular networks in the vicinity of the device 201. The Wi-Fi network 230 may send to the device 201 an indication that the device 201 should not continue to scan for such cellular networks as the chance of locating and connecting to a given one of those cellular networks is low. For example, when the device 201 is in a location that is not populated with cellular networks, the chance of locating and connecting to a given one of those cellular networks may be low.

For example, the device 201 may be connected 240 to the first cellular network 210. Alternatively, the device 201 may not be connected to any cellular network. The device 201 may detect 241 the Wi-Fi network 230 within a range of the device 201. The device 201 may connect to the Wi-Fi network 230. The Wi-Fi network 230 may send to the device 201 information indicating that a second cellular network 220 is within a range of the device 201. The indication that the second cellular network 220 is within a range of the device 201 may comprise one or more details or characteristics of the second cellular network 220. The one or more details or characteristics of the second cellular network 220 may comprise a location of the second cellular network 220, one or more bands of the second cellular network 220, an MNO or MSO cellular network load, etc.

The device 201 may receive the information 242 associated with the second cellular network 220. This information may be received while the device 201 is still connected to the first cellular network 210. The device 201 may store the information associated with the second cellular network 220. The device 201 may scan for the second cellular network 220 based on the one or more details or characteristics of the second cellular network 220 indicated by the information. The device 201 may connect to the second cellular network 220 upon detecting the second cellular network 220. The device 201 may not scan for the second cellular network 220 upon receiving the second cellular network 220 information and may instead scan for the second cellular network 220 at a later time.

The device 201 may connect 243 to the second cellular network for sending and receiving data. The device 201 may switch from the first cellular network 210 to the second cellular network 220 for sending and receiving data. The device 201 may switch from the Wi-Fi network 230 to the second cellular network 220 (e.g., when the device 201 is out of range of the Wi-Fi network 230) for sending and receiving data. The device 201 may maintain a connection with the Wi-Fi network 230 and may connect to the second cellular network 220. The device 201 may send and receive cellular data using the first cellular network 210 or the second cellular network 220 and may send and receive other data using the Wi-Fi network 230. The device 201 may maintain a connection with the first cellular network 210 and the second cellular network 220, and the device 201 may prioritize a given one of the networks over the other networks, such as prioritizing the second cellular network 220 over the first cellular network 210 when for sending and receiving data.

Figure 3:
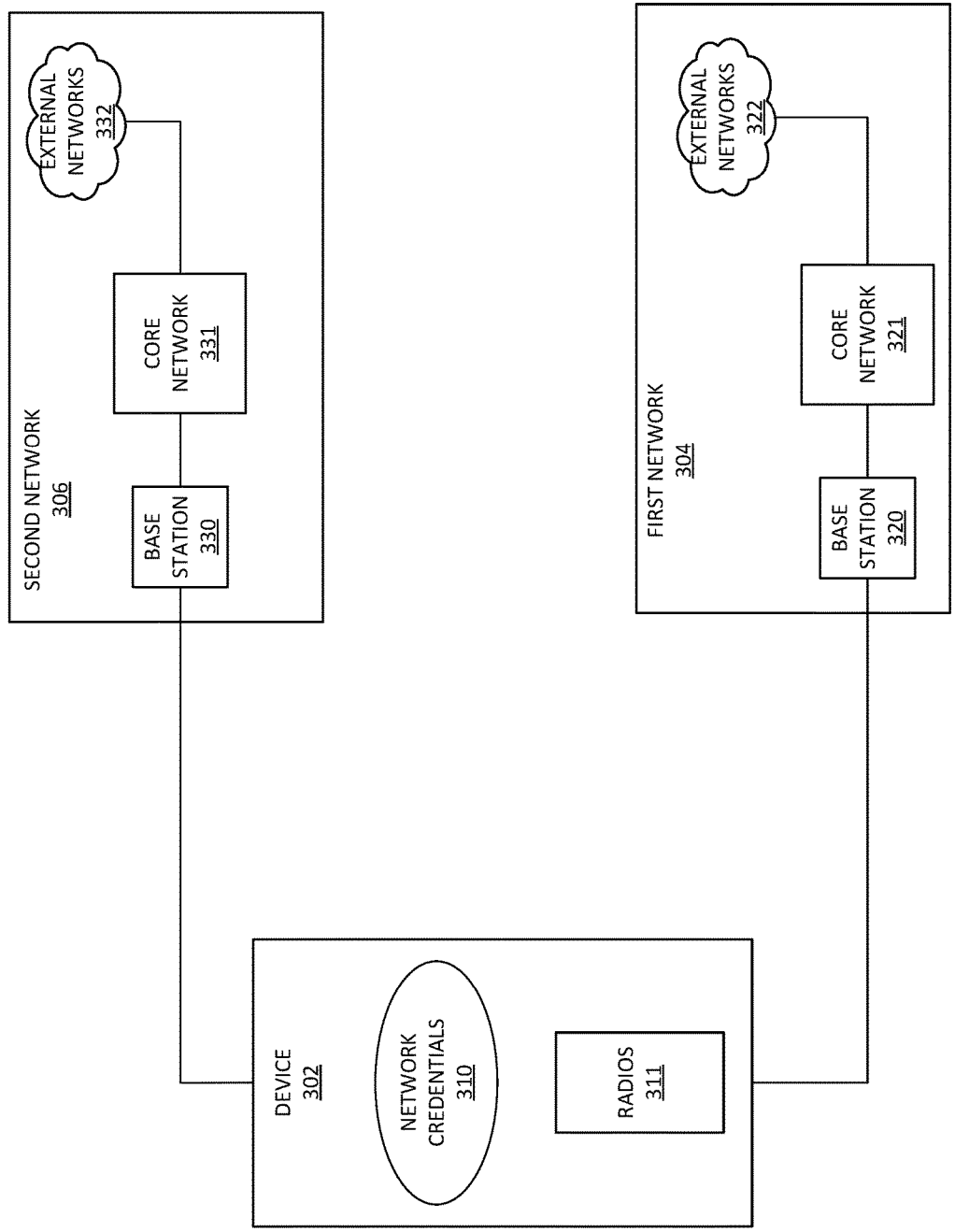
FIG. 3 shows an example system.

FIG. 3 shows a block diagram of an example system 300. The system 300 shows a device 302 such as a mobile device, a first network 304, and a second network 306. The device 302 may comprise one or more network credentials 310 as described above. The device 302 may comprise one or more radios 311 capable of communicating with a wireless network. The device 302 may be configured to communicate using the one or more radios 311 with a wireless network such as a cellular network. The device 302 may be configured to communicate using the one or more radios 311 with a cellular network based on any generation of cellular network technology including but not limited to 4G, 5G NSA, or 5G b SA cellular network technology.

The first network 304 may comprise an MNO network. The first network 304 may comprise a base station 320 and a core network 321. The core network 321 may provide access to external networks 322 such as the Internet Protocol (IP) Multimedia Core Network Subsystem (IMS) or the public switched telephone network (PSTN). The core network 321 may comprise network elements associated with a cellular technology such as 4G, 5G NSA, or 5G SA. For example, the core network 321 may comprise an HSS, a serving gateway that routes incoming and outgoing packets, a packet data network (PDN) gateway that connects the core network 321 to the external networks 322, and a mobility management entity (MME) that handles security and mobility signaling for access. The base station 320 may provide the device 302 a connection to the first network 304. The base station 320 may be based on a cellular technology such as 4G, 5G NSA, or 5G SA. For example, the base station 320 may comprise an evolved NodeB (eNB) for 4G networks or a next generation NodeB (gNB) for 5G networks.

The second network 306 may comprise an MSO network. The second network 306 may comprise a base station 330 and a cellular core network 331. The core network 331 may provide access to external networks 332 such as the IMS or the PSTN. The core network 331 may comprise network elements associated with a cellular technology such as 4G, 5G NSA, or 5G SA. For example, the core network 331 may comprise an HSS, a serving gateway that routes incoming and outgoing packets, a PDN gateway that connects the core network 331 to the external networks 332, and an MME that handles security and mobility signaling for access. The base station 330 may provide the device 302 a connection to the second network 306. The base station 330 may be based on a cellular technology such as 4G, 5G NSA, or 5G SA. For example, the base station 330 may comprise an eNB for 4G networks or a gNB for 5G networks.

For example, the device 302 may attach to the first network 304 using first subscription information associated with the one or more network credentials 310 and may attach to the second network 306 using second subscription information associated with the one or more network credentials 310. A policy of the device 302 may dictate which PDN service is provided from either the first network 304 or the second network 306. In the absence of the first network 304 or the second network 306, all PDN services may be provided by one network.

Figure 4:
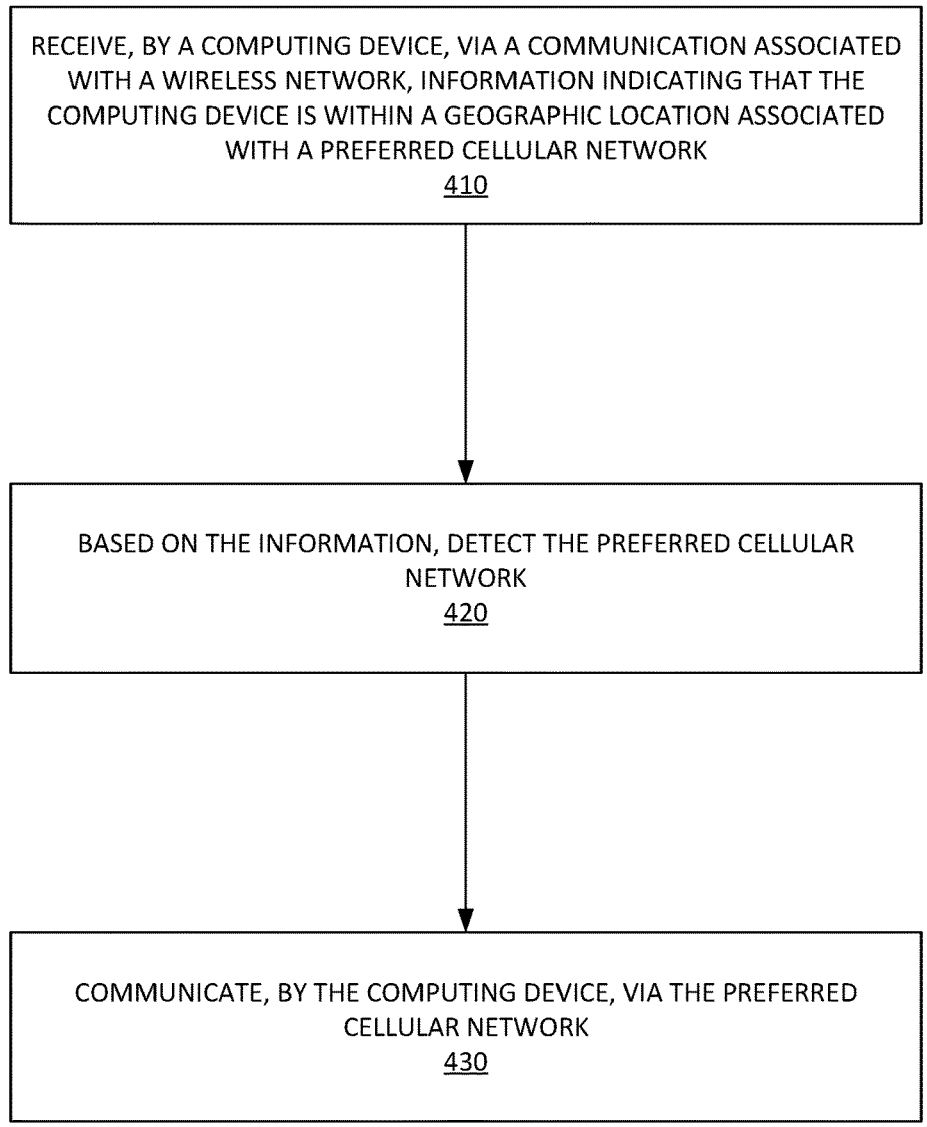
FIG. 4 shows an example method.

FIG. 4 shows an example method 400. The method 400 of FIG. 4, may be performed by any of the devices depicted in FIGS. 1-3. While each step in the method 400 of FIG. 4 is shown and described separately, multiple steps may be executed in a different order than what is shown, in parallel with each other, or concurrently with each other. At step 410, a computing device may receive, via a communication associated with a wireless network, information indicating that the computing device is within a geographic location associated with a preferred cellular network. The wireless network may be operated by a first service provider. The first service provider may comprise an MSO, a partner of the MSO, or an MNO. The preferred cellular network may comprise a cellular network or Wi-Fi network that is operated by the first service provider such as the MSO or the partner of the MSO (e.g., the same operator of the wireless network). Alternatively, the preferred cellular network may be operated by the second service provider (e.g., a different operator of the wireless network). The second service provider may comprise an MSO, a partner of the MSO, or an MNO. The preferred cellular network may operate at a lower cost than other networks that the computing device is nearby.

The information may comprise at least one of: a cellular network operator, coverage bounds for a geographic location, or one or more bands available for the geographic location. The information may be received during at least one of: a Wi-Fi discovery procedure or a connection or disconnection procedure with the Wi-Fi network. The information may be received in a MAC layer control frame, a MAC layer management frame, an ANQP frame, or a GAS frame.

At step 420, the computing device may detect, based on the information, the preferred cellular network. At step 430, the computing device may communicate via the preferred cellular network. If the computing device is connected to the wireless network, the computing device may terminate or maintain the connection with the wireless network. If the computing device is connected to different cellular network than the preferred cellular network, the computing device may terminate or maintain the connection with the different cellular network. The different cellular network may be operated by a different service provider than the preferred cellular network. The preferred cellular network may be prioritized over the different cellular network for sending and receiving data.

Figure 5:
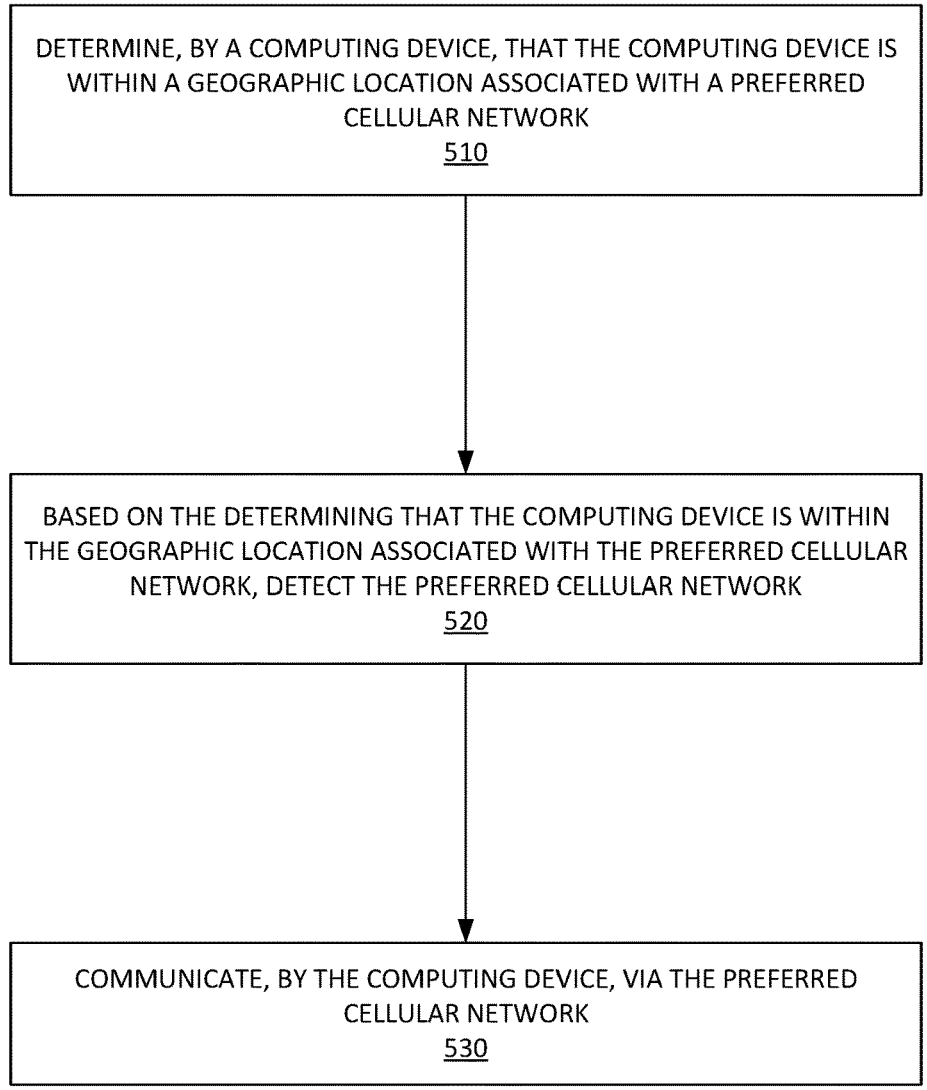
FIG. 5 shows an example method.

FIG. 5 shows an example method 500. While each step in the method 500 of FIG. 5 is shown and described separately, multiple steps may be executed in a different order than what is shown, in parallel with each other, or concurrently with each other. At step 510, a computing device may determine that the computing device is within a geographic location associated with a preferred cellular network. The preferred cellular network may comprise a cellular network or Wi-Fi network that is operated by a first service provider such as the MSO or a partner of the MSO. The preferred cellular network may operate at a lower cost than other networks that the computing device is nearby. The determining that the computing device is within the geographic location associated with the preferred cellular network may be based on information stored on the device. When the device scans for available networks, the device may determine, based on the stored information, that one of available networks is the preferred cellular network. The stored information may comprise at least one of: a cellular network operator, coverage bounds for a geographic location, or one or more bands available for the geographic location.

At step 520, the computing device may detect, based on the determining that the computing device is within the geographic location associated with the preferred cellular network, the preferred cellular network. At step 530, the computing device may communicate via the preferred cellular network. If the computing device is connected to different network than the preferred cellular network, the computing device may terminate or maintain the connection with the different network. The different network may be operated by a different service provider than the preferred cellular network. The preferred cellular network may be prioritized over the different network for sending and receiving data.

Figure 6:
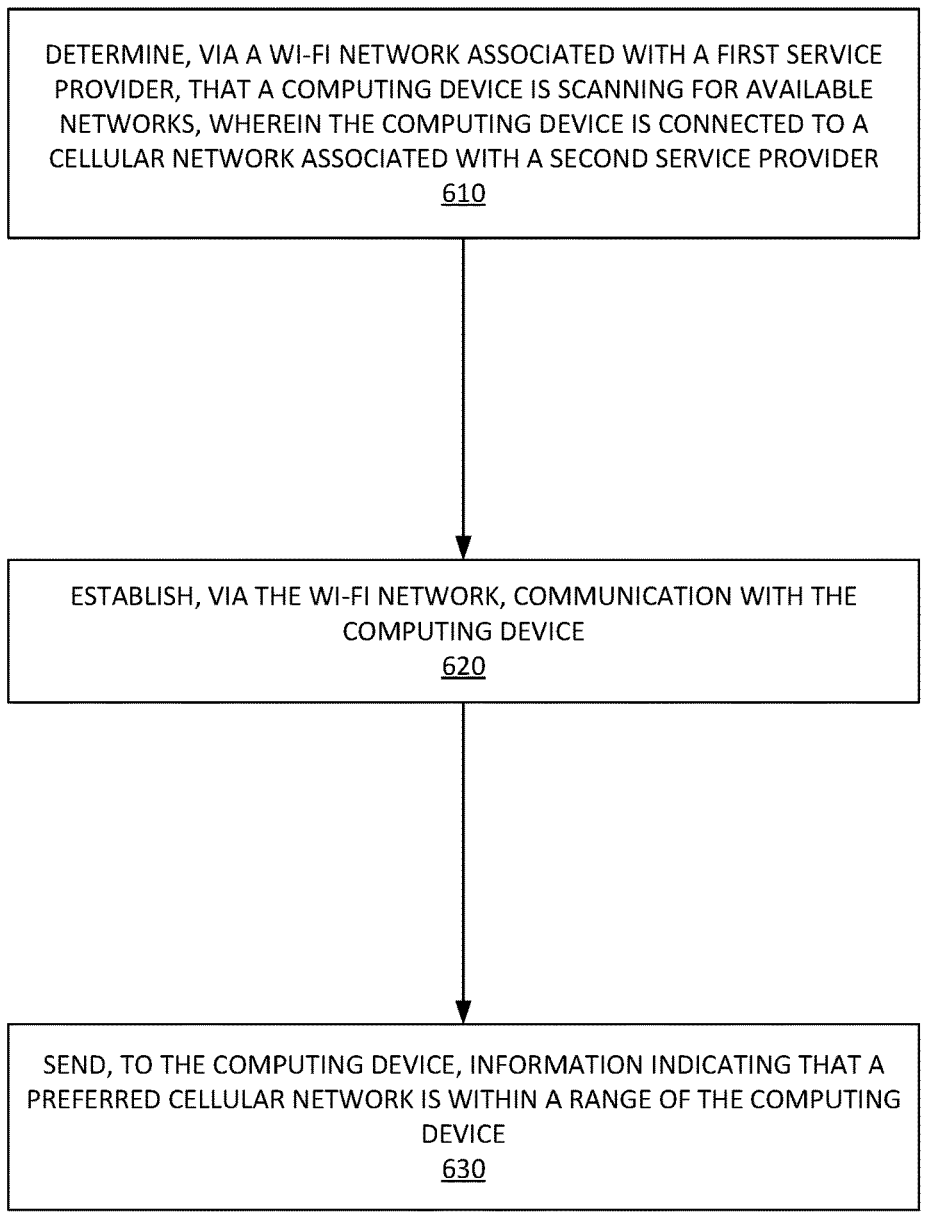
FIG. 6 shows an example method.

FIG. 6 shows an example method 600. While each step in the method 600 of FIG. 6 is shown and described separately, multiple steps may be executed in a different order than what is shown, in parallel with each other, or concurrently with each other. At step 610, it may be determined, via a Wi-Fi network associated with a first service provider, that a computing device is scanning for available networks, wherein the computing device is connected to a cellular network associated with a second service provider. The first service provider may comprise an MSO, a partner of the MSO, or an MNO. The second service provider may comprise an MSO, a partner of the MSO, or an MNO. At step 620, communication with the computing device may be established via the Wi-Fi network.

At step 630, information indicating that a preferred cellular network is within a range of the computing device may be sent to the computing device. The information may comprise at least one of: a cellular network operator, coverage bounds for a geographic location, or one or more bands available for the geographic location. The information may be received during at least one of: a Wi-Fi discovery procedure or a connection or disconnection procedure with the Wi-Fi network. The information may be received in a MAC layer control frame, a MAC layer management frame, an ANQP frame, or a GAS frame.

Figure 7:
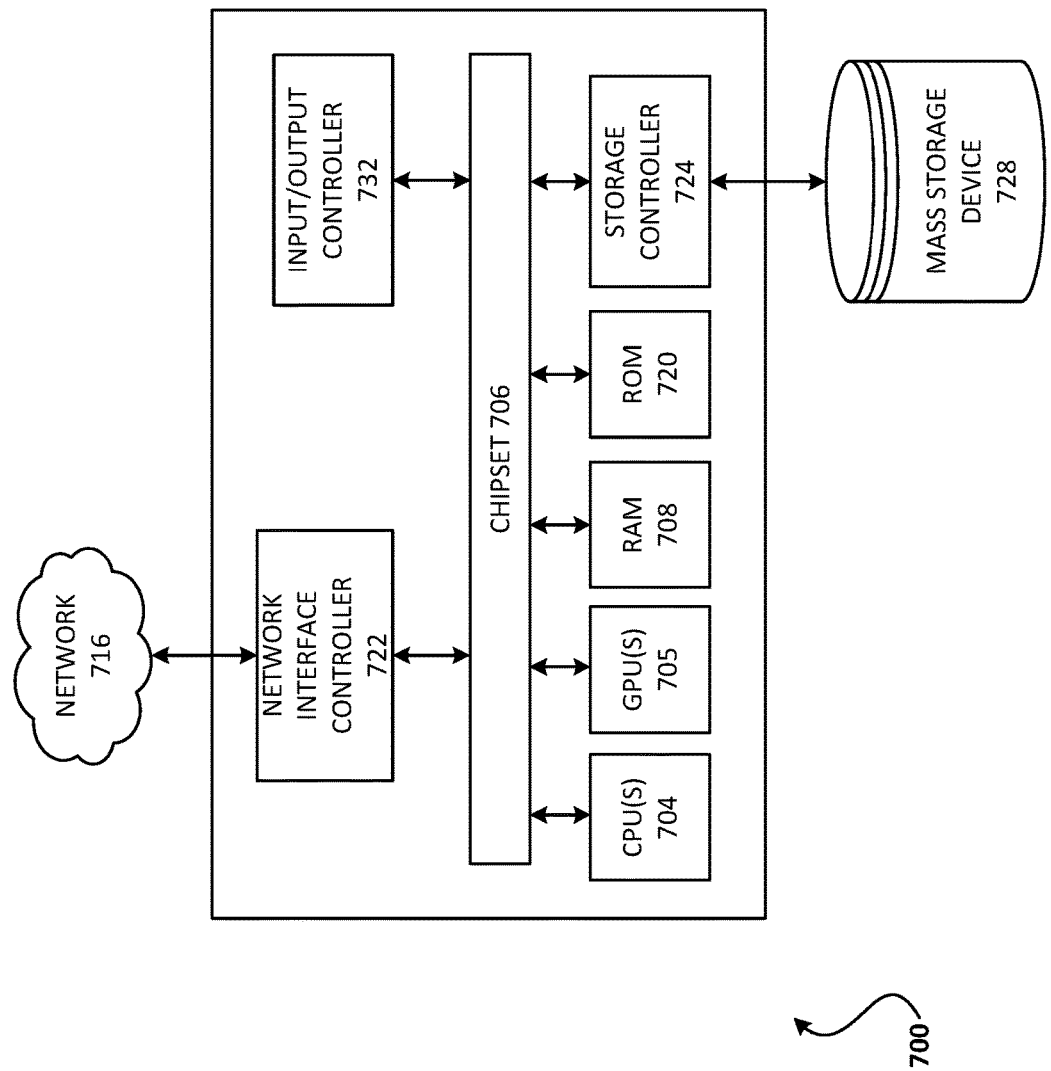
FIG. 7 shows an example computing device.

FIG. 7 depicts a computing device that may be used in various aspects, such as the servers, modules, and/or devices depicted in FIGS. 1-3. With regard to the example architecture of FIGS. 1-3, each device depicted in FIGS. 1-3 may be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIG. 1.

The computing device 700 may comprise a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A chipset 706 may provide an interface between the CPU(s) 704 and the remainder of the components and devices on the baseboard. The chipset 706 may provide an interface to a random access memory (RAM) 708 used as the main memory in the computing device 700. The chipset 706 may provide an interface to a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a mass storage device 728 that provides non-volatile storage for the computer. The mass storage device 728 may store system programs, application programs, other program modules, and data, which have been described in greater detail herein. The mass storage device 728 may be connected to the computing device 700 through a storage controller 724 connected to the chipset 706. The mass storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a mass storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 728 is characterized as primary or secondary storage and the like.

For example, the computing device 700 may store information to the mass storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may read information from the mass storage device 728 by detecting the physical states or characteristics of one or more particular locations within the physical storage units.

In addition to the mass storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 728 may store other system or application programs and data utilized by the computing device 700.

The mass storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 2 and 4-6.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example

What is claimed:

1. A method comprising:
receiving, by a computing device, via a communication associated with a wireless network, information indicating that the computing device is within a geographic location associated with a preferred cellular network;
based on the information, detecting the preferred cellular network; and
communicating, by the computing device, via the preferred cellular network.

2. The method of claim 1, wherein the information comprises at least one of: a cellular network operator, coverage bounds for the geographic location, or one or more bands available for the geographic location.

3. The method of claim 1, wherein the preferred cellular network and the wireless network are operated by a first service provider and other networks within the geographic location are operated by a second service provider.

4. The method of claim 1, wherein the wireless network and the preferred cellular network are operated by different service providers.

5. The method of claim 1, wherein the communicating comprises:
sending, to a device associated with the preferred cellular network, at least one message, wherein the at least one message is associated with at least one of:
connecting to the preferred cellular network or establishing a session with the device.

6. The method of claim 1, further comprising:
communicating, via the wireless network, after the communicating with the preferred cellular network.

7. The method of claim 1, further comprising:
after the communicating with the preferred cellular network, terminating a connection with at least one of a cellular network or the wireless network.

8. The method of claim 1, further comprising:
after the communicating with the preferred cellular network, maintaining communication with a cellular network, wherein the preferred cellular network is prioritized over the cellular network when sending or receiving data.

9. The method of claim 1, wherein the wireless network comprises one or more of: a wireless local area network (WLAN), a Wi-Fi network, an Institute of Electrical and Electronics Engineers (IEEE) 802.11 based network, a small cellular network, a 4G network, a 5G non-standalone (NSA) network, or a 5G standalone (SA) cellular network.

10. The method of claim 1, wherein the preferred cellular network comprises one or more of: a small cellular network, a 4G network, a 5G non-standalone (NSA) network, or a 5G standalone (SA) network.

11. The method of claim 1, wherein the detecting the preferred cellular network comprises scanning for the preferred cellular network.

12. The method of claim 11, wherein the scanning for the preferred cellular network comprises:
scanning after receiving the information to reduce battery power consumption by the computing device.

13. A method comprising:
determining, by a computing device, that the computing device is within a geographic location associated with a preferred cellular network;
based on the determining that the computing device is within the geographic location associated with the preferred cellular network, detecting the preferred cellular network; and
communicating, by the computing device, via the preferred cellular network.

14. The method of claim 13, wherein the information comprises at least one of: a cellular network operator, coverage bounds for the geographic location, or one or more bands available for the geographic location.

15. The method of claim 13, further comprising:
after the communicating with the preferred cellular network, terminating a connection with a cellular network.

16. The method of claim 13, further comprising:
after the communicating with the preferred cellular network, maintaining communication with a cellular network, wherein the preferred cellular network is prioritized over the cellular network when sending or receiving data.

17. The method of claim 13, wherein the detecting the preferred cellular network comprises scanning for the preferred cellular network.

18. A method comprising:
determining, via a Wi-Fi network associated with a first service provider, that a computing device is scanning for available networks, wherein the computing device is connected to a cellular network associated with a second service provider
establishing, via the Wi-Fi network, communication with the computing device; and
sending, to the computing device, information indicating that the computing device is within a geographic location associated with a preferred cellular network.

19. The method of claim 18, wherein the information comprises at least one of: a cellular network operator, coverage bounds for a geographic location, or one or more bands available for the geographic location.

20. The method of claim 18, wherein the preferred cellular network comprises one or more of: a small cellular network, a 4G network, a 5G non-standalone (NSA) network, or a 5G standalone (SA) network.

* * * * *